(No Model.)
J. M. WARD.
DEVICE FOR THE MANUFACTURE OF TIN CANS.
No. 244,344. Patented July 12, 1881.
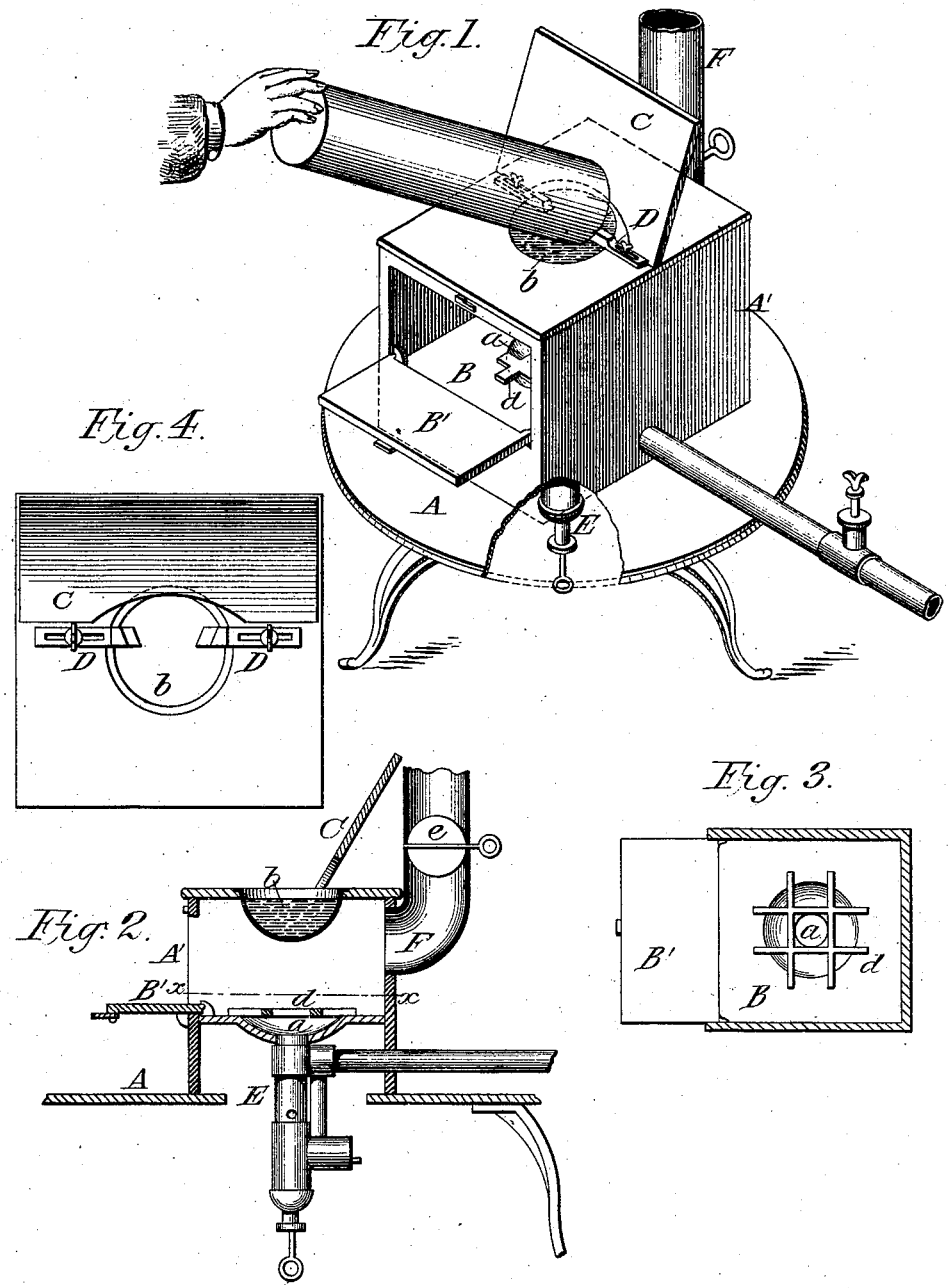
Witnesses:
E. R. Hill.
J. W<sup>m</sup> Strehli.
Inventor:
James M. Ward
per W<sup>m</sup> Hubbell Fisher,
Att'y
N. PETERS, Photo-Lithographer, Washington, D. C.

United States Patent Office.

JAMES M. WARD, OF CINCINNATI, OHIO, ASSIGNOR OF ONE-HALF TO HENRY VERHAGE, OF SAME PLACE.

DEVICE FOR THE MANUFACTURE OF TIN CANS.

SPECIFICATION forming part of Letters Patent No. 244,344, dated July 12, 1881.

Application filed February 11, 1881. (No model.)

*To all whom it may concern:*

Be it known that I, JAMES M. WARD, of Cincinnati, Hamilton county, Ohio, have invented certain new and useful Improvements in Devices for the Manufacture of Tin Cans, of which the following is a specification.

The principal object of my invention is to provide an improved means for soldering the bottom and top of the can to the side, and at the same time to provide means for heating a soldering-iron to seal the side seam of the can.

I am aware that devices have been employed for soldering the bottom of the can by floating, but in all of such devices the objection is urged that another heating apparatus is required to heat an iron to solder the side seam of the can. This objection is removed by my invention.

Referring to the drawings, Figure 1 is a perspective view of my invention. Fig. 2 is a central longitudinal section through the same. Fig. 3 is a horizontal section of my invention taken at the line $x$ $x$, Fig. 2; and Fig. 4 is a plan view of the top of my invention.

A represents the table or platform of my device, upon which rests the box A'. This box A' is provided, near its bottom, with the horizontal plate B, at or near the center of which is the opening $a$. The plate B is preferably dished or concave at the center, as shown, and forms the floor of the heating-chamber.

At the front of the box A' is the door B', which is hinged at its lower edge in such a manner that when opened it will form a shelf, as shown, and the upper surface of said shelf will be a little above the level of the plate B.

In the top of the box A' is an opening to receive the pot or ladle $b$, in which the solder is melted. This pot is here shown as being hemispherical, but it need not necessarily be made of this exact shape. The pot $b$ can be readily removed and a lid or cover substituted when it is desired to heat a seaming-iron.

On the top of the box A' is the inclined bracket or guide C, against which to rest the can when the bottom is being soldered on. This bracket is permanently attached to the top of the box and extends partly over the pot $b$, as shown, so that when the can rests against it the edge or angle formed by the bottom and side of the can will be about in the center of the pot, in order that this said edge or corner of the can may be dipped deeply into the pot.

At the sides of the pot are the guides or stops D, which are adjustably secured to the top of the box A'. The purpose of the guides is to form a rest for the can and regulate the depth to which it shall be dipped into the solder in the pot $b$, and also permit cans of different diameters (in cross-section) to be floated on the same machine, as by causing the stops to approach the center of the pot a small can may be soldered and will not be permitted to dip too deep into the solder, and by separating the stops a larger can may be soldered, and yet be allowed to dip to the required depth in the solder in the pot.

In the bottom of the box A' is situated a burner, E, (here shown as being a Jones generator,) which may be of any desired form, to burn either gas or oil. The top of this burner extends through the opening $a$ in the plate B, and above the end of the burner is a grate, $d$, the ends of which rest on the flat portion of the plate B. Upon this grate rests the seaming-iron when it is to be heated. The dishing of the plate B permits the flame from the burner to circulate under the grate $d$, and thus form a better means for heating the seaming-iron than if the plate B were perfectly flat. The burner E is located directly under the pot $b$.

A flue, F, communicates with the interior of the box A', to provide the requisite amount of draft for the burner E, and this flue is preferably provided with a damper, $e$, to regulate the draft.

The operation of my invention is as follows: The pot $b$ having been removed, a lid or cover is placed over the opening in the top of the box A', and the door B' is opened and occupies the position shown in the drawings. The gas from the burner E is lighted and the seaming-iron placed on the grate $d$ above the flame, the door B' serving as a shelf upon which to rest the handle of the seaming-iron. With this seaming-iron the side seam of the can is soldered. When a sufficient number of cans have been thus far prepared, the cover is removed from the top of the box and the pot $b$ placed in the opening and the door B' is closed. The required amount of solder is placed in the pot $b$ and is melted by the flame from the burner E. The operator now takes the can and, having placed the bottom on the can and having preferably dusted the outside edge of the bottom with rosin, places said bottom against the bracket C, as shown in Fig. 1, and revolves it with his hand.

The stops D have previously been adjusted for the particular size of can being manufactured, so as to permit the joint between the bottom of the can and the side to be immersed in the melted solder in the pot $b$, so that when the can is revolved the joint is effectually sealed.

The top of the can may be soldered on in the same manner.

Among the advantages gained by my invention is that I am enabled to complete the soldering of the can without the necessity of being provided with a separate heating device for heating the seaming-iron, which is the case by the use of other soldering-machines now in use; also, the solder more perfectly enters the joint between the bottom and side of the can by the use of my invention than when floating machines, in which but a small amount of solder is heated at once, are used, and thus a more secure seam is made.

What I claim as new and of my invention, and desire to secure by Letters Patent, is—

1. The box A′, provided with door B′ and the removable pot $b$, the plate B, grate $d$, and a suitable heating device, substantially as and for the purposes specified.

2. The combination of the box A′, provided with shelf B′ and plate B, the latter being concave on its upper surface, the grate $d$, and a suitable heating device, substantially as and for the purposes specified.

3. The combination of the box A′, provided with door B′ and plate B, the latter being concave on its upper surface, the grate $d$, removable pot $b$, stationary bracket C, flue F, and a suitable heating device, substantially as and for the purposes specified.

4. The combination of the box A′, provided with door B′ and plate B, the latter being concave on its upper surface, the grate $d$, removable pot $b$, stationary bracket C, adjustable stops D, flue F, and a suitable heating device, substantially as and for the purposes specified.

JAMES M. WARD.

Witnesses:
THOMAS M. CONWAY,
E. R. HILL.